US012026975B2

(12) United States Patent
McDonald et al.

(10) Patent No.: US 12,026,975 B2
(45) Date of Patent: Jul. 2, 2024

(54) WHOLE PERSON ASSOCIATION WITH FACE SCREENING

(71) Applicants: Google LLC, Mountain View, CA (US); Robert McDonald, Boca Raton, FL (US); Shrenik Lad, Sunnyvale, CA (US); Andrew Gallagher, Fremont, CA (US)

(72) Inventors: Robert McDonald, Boca Raton, FL (US); Shrenik Lad, Sunnyvale, CA (US); Andrew Gallagher, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 444 days.

(21) Appl. No.: 17/425,435

(22) PCT Filed: Jan. 25, 2019

(86) PCT No.: PCT/US2019/015145
§ 371 (c)(1),
(2) Date: Jul. 23, 2021

(87) PCT Pub. No.: WO2020/153971
PCT Pub. Date: Jul. 30, 2020

(65) Prior Publication Data
US 2022/0101646 A1 Mar. 31, 2022

(51) Int. Cl.
*G06V 40/16* (2022.01)
*G06T 7/246* (2017.01)
(Continued)

(52) U.S. Cl.
CPC ............ *G06V 40/165* (2022.01); *G06T 7/246* (2017.01); *G06T 7/74* (2017.01); *G06V 10/454* (2022.01);
(Continued)

(58) Field of Classification Search
CPC .... G06V 10/44; G06V 10/454; G06V 10/757; G06V 10/764; G06V 10/80;
(Continued)

(56) References Cited

U.S. PATENT DOCUMENTS

| 8,842,213 B2* | 9/2014 | Tomita et al. ........... G02B 7/28 396/122 |
| 2013/0215139 A1 | 8/2013 | Xie et al. |

(Continued)

OTHER PUBLICATIONS

International Preliminary Report on Patentability for Application No. PCT/US2019/015145, dated Aug. 5, 2021, 10 pages.
(Continued)

*Primary Examiner* — Andrew W Johns
(74) *Attorney, Agent, or Firm* — DORITY & MANNING P.A.

(57) ABSTRACT

Example aspects of the present disclosure are directed to computing systems and methods that perform whole person association with face screening and/or face hallucination. In particular, one aspect of the closure is directed to a multi-headed person and face detection model that performs both face and person detection in one model. Each of the face and person detection can find landmarks or other pose information and also a confidence score. The pose information for the face and person detections can be used to select certain face and person detections to associate together as a whole person detection, which can be referred to as an "appearance."

13 Claims, 12 Drawing Sheets

(51) Int. Cl.
*G06T 7/73* (2017.01)
*G06V 10/44* (2022.01)
*G06V 10/764* (2022.01)
*G06V 10/80* (2022.01)
*G06V 10/82* (2022.01)
*G06V 10/98* (2022.01)
*G06V 40/10* (2022.01)
*G06N 20/00* (2019.01)

(52) U.S. Cl.
CPC .......... *G06V 10/764* (2022.01); *G06V 10/806* (2022.01); *G06V 10/809* (2022.01); *G06V 10/82* (2022.01); *G06V 10/98* (2022.01); *G06V 40/103* (2022.01); *G06V 40/161* (2022.01); *G06N 20/00* (2019.01); *G06T 2207/20081* (2013.01); *G06T 2207/30201* (2013.01); *G06V 40/172* (2022.01)

(58) Field of Classification Search
CPC .... G06V 10/806; G06V 10/809; G06V 10/98; G06V 40/103; G06V 40/16; G06V 40/161; G06V 40/165; G06V 40/171; G06V 40/172; G06T 7/246; G06T 7/251; G06T 7/70; G06T 7/73; G06T 7/74; G06T 2207/20081; G06T 2207/30196; G06T 2207/30201
See application file for complete search history.

(56) References Cited

U.S. PATENT DOCUMENTS

2013/0215319 A1* 8/2013 Tomita et al. ....... G06V 10/245
  382/218
2014/0211985 A1* 7/2014 Polese et al. .......... G06V 40/10
  382/103

OTHER PUBLICATIONS

International Search Report for Application No. PCT/US2019/015145, dated Nov. 12, 2019, 2 pages.
Junjie Yan et al., "Face Detection by Structural Models", Image and Vision Computing, vol. 32, No. 10, Dec. 5, 2013, pp. 790-799.

* cited by examiner

… (1) …

WHOLE PERSON ASSOCIATION WITH FACE SCREENING

PRIORITY CLAIM

This application is based upon and claims the right of priority under 35 U.S.C. § 371 to International Application No. PCT/US2019/015145 filed on Jan. 25, 2019. Applicant claims priority to and the benefit of each of such applications and incorporates all such applications herein by reference in their entirety.

FIELD

The present disclosure relates generally to detecting persons in imagery. More particularly, the present disclosure relates to a whole person association system that can perform face hallucination and/or screening.

BACKGROUND

The detection of humans in imagery (e.g., still frames and/or video) by computers can be useful for guiding performance of a large number of different tasks. For example, various aspects (e.g., position, image capture behavior, etc.) of a camera (e.g., a security camera) can be controlled based on whether one or more humans are present in the current viewpoint of the camera. As another example, an autonomous vehicle can include cameras and can analyze the imagery captured by the cameras to determine the presence of human pedestrians in its surrounding environment and operate accordingly. As yet another example, detecting humans in images can be a first stage in a larger process that includes a number of downstream actions performed after detection of the human, such as, for example, recognizing the human (e.g., to unlock a mobile device), detecting a gaze direction associated with the human (e.g., to understand a subject of a verbal command issued by the human), or other activities.

In most existing systems, a computing system detects humans in imagery through application of either a face detector or a person detector to the imagery. The face detector can be a computer-implemented component that is configured to detect human faces in images (e.g., specifically the face and not other body portions). The person detector can be a computer-implemented component that is configured to detect human bodies in images (e.g., a majority of the whole body and not just the face). In state-of-the-art systems, these detectors (e.g., face detector or person detector) are machine-learned models that have been trained to perform their detection operations using machine learning techniques. However, each of these detectors may fail by producing either false positives (e.g., detecting something that is not there) or false negatives (e.g., failing to detect an object depicted in the imagery). Both false positives and false negatives can have detrimental effects on the efficacy of the associated systems.

Further, certain systems may include and execute separate face and person detectors. However, there are a number of drawbacks to this approach. First, the inclusion and usage of two different detectors requires a significant amount of computation or other resource usage (e.g., memory usage, processor usage, energy consumption, etc.). Second, the two detectors often result in conflicting information (e.g., where a person is found, but there is not a nearby face detection, and vice versa). Third, there is not as of yet a direct way to associate the detected faces and persons, which leaves the computing system unable to know if the detections refer to one human being or two.

SUMMARY

Aspects and advantages of embodiments of the present disclosure will be set forth in part in the following description, or can be learned from the description, or can be learned through practice of the embodiments.

One example aspect of the present disclosure is directed to a computer system that screens face detections based on association with person detections. The computer system includes one or more processors; a machine-learned person detection model that is configured to detect human bodies depicted in images; a machine-learned face detection model that is configured to detect human faces depicted in images; and one or more non-transitory computer-readable media that collectively store instructions that, when executed by one or more computing devices, cause the computer system to perform operations. The operations include obtaining an input image. The operations include inputting the input image into the machine-learned person detection model and the machine-learned face detection model. The operations include receiving one or more person detections as an output of the machine-learned person detection model, wherein each of the one or more person detections indicates a respective detected body location of a respective detected human body in the input image. The operations include receiving one or more face detections as an output of the machine-learned face detection model, wherein each of the one or more face detections indicates a respective detected face location of a respective detected human face in the input image. The operations include, for at least a first face detection of the one or more face detections: determining whether the first face detection is associated with one of the person detections; and modifying one or both of a first confidence score associated with the first face detection and a first confidence threshold associated with the first face detection based at least in part on whether the first face detection is associated with one of the person detections.

Another example aspect of the present disclosure is directed to a computer-implemented method to hallucinate face detections in images. The method includes obtaining, by one or more computing devices, an input image. The method includes inputting, by the one or more computing devices, the input image into a machine-learned person detection model that is configured to detect human bodies depicted in images. The method includes receiving, by the one or more computing devices, a person detection as an output of the machine-learned person detection model, wherein the person detection indicates a detected body location of a detected human body in the input image. The method includes generating, by the one or more computing devices, a hallucinated face detection based at least in part on the detected body location of the detected human body provided by the person detection, wherein the hallucinated face detection indicates a hallucinated face location in the input image of a face associated with the detected human body.

Another example aspect of the present disclosure is directed to one or more non-transitory computer-readable media that collectively store instructions that, when executed by one or more processors, cause the one or more processors to perform operations. The operations include determining one or more face detections and one or more person detections relative to an image, where each face detection indicates a respective region or set of pixels of the image believed to contain a face and each person detection indicates a respective region or set of pixels believed to contain a person. The operations include computing a respective confidence score associated with each face detection and each putative person detection. The operations include identifying a respective set of pose points associated with each person detection that indicate a location of a set of body landmarks. The operations include determining an association score between at least a first face detection and at least a first person detection using the respective set of pose points associated with the first person detection. The operations include using the association score and the respective confidence score for the first face detection to produce an updated confidence score for the first face detection. The operations include determining whether to discard the first face detection based on a comparison of the updated confidence scores to a confidence threshold.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
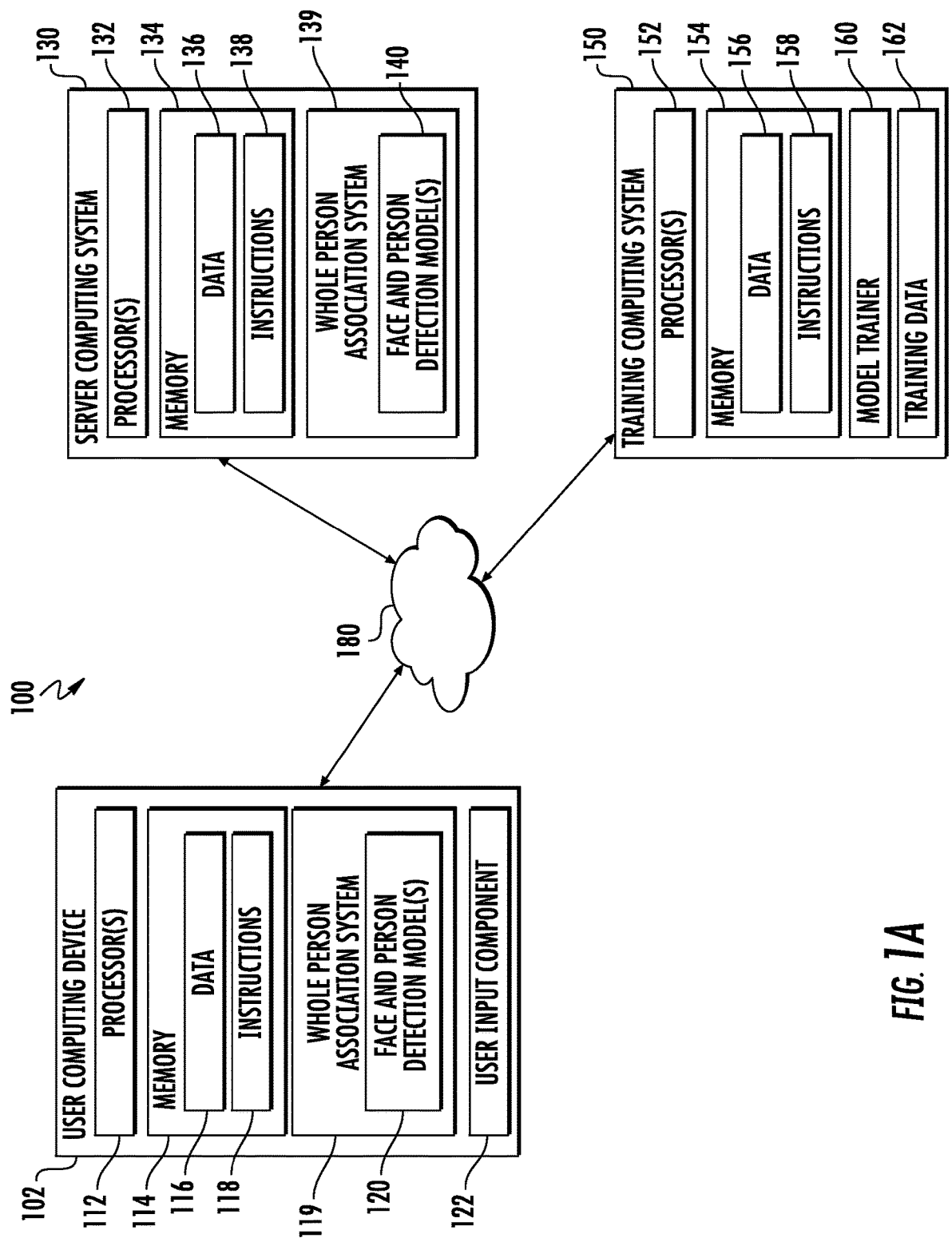
FIG. 1A depicts a block diagram of an example computing system that performs whole person association according to example embodiments of the present disclosure.

Reference numerals that are repeated across plural figures are intended to identify the same features in various implementations.

DETAILED DESCRIPTION

Overview

Example aspects of the present disclosure are directed to computing systems and methods that perform whole person association with face screening and/or face hallucination. In particular, one aspect of the present disclosure is directed to a multi-headed person and face detection model that performs both face and person detection in one model. Each of the face and person detection can find landmarks or other pose information and also a confidence score. The pose information for the face and person detections can be used to select certain face and person detections to associate together as a whole person detection, which can be referred to as an "appearance." Another aspect of the present disclosure is directed to face screening based on association of face detections with person detections. In particular, systems and methods of the present disclosure can use the juxtapositions of face and person detections to adjust the confidence scores and/or corresponding thresholds. For example, a low confidence face detection that neatly aligns with a person detection can instead be viewed as high confidence that a face is there. However, if a low confidence face detection does not align with a person detection, its confidence is reduced (or, alternatively, not increased). Yet another aspect of the present disclosure is directed to face hallucination. In particular, systems and methods of the present disclosure can use person detection landmarks to 'hallucinate' a face detection. Through application of the face screening and hallucination techniques described herein, more complete and accurate face and/or whole person detections can be generated, thereby improving the accuracy or other qualities of any activity performed on the basis of face and/or whole person detections.

More particularly, according to an aspect of the present disclosure, a computer system can include both a person detection model and a face detection model. In some implementations, the person detection model and/or the face detection model can be machine-learned models, such as, for example, artificial neural networks (hereinafter "neural networks) such as convolutional neural networks.

Each of the person detection model and the face detection model can be configured to process input imagery. The input imagery can include two-dimensional imagery or three-dimensional imagery. For example, the input imagery can include images captured by a camera (e.g., visible spectrum camera, infrared camera, hyperspectral camera, etc.). The images can be expressed in any number of different color spaces (e.g., greyscale, RGB, CMYK, etc.). As another example, the input imagery can include imagery generated by a Light Detection and Ranging ("LIDAR") system or a Radio Detection and Ranging ("RADAR") system. For example, the input imagery can be or include a two- or three-dimensional point cloud of detected data points.

The person detection model can be configured (e.g., trained) to detect human bodies depicted in images. For example, the person detection model can be configured to look for a majority of a human body (e.g., including the torso, head, and limbs) and not just the face. Thus, given an input image, the person detection model can output one or more person detections, where each person detection indicates a respective detected body location of a respective detected human body in the input image.

The location of the human body can be indicated in a number of different ways. As one example, a person detection can indicate the location of the detected body as a bounding shape. The bounding shape can be a two-dimensional shape or a three-dimensional shape (e.g., depending on the dimensional structure of the input image). The bounding shape can identify a set of pixels (or voxels) in the imagery that correspond to the location of the body within the image. The bounding shape can be a polygonal shape (e.g., a box or cube), a curved shape (e.g., circle or oval), or an arbitrary shape (e.g., a segmentation mask that identifies a specific set of pixels or voxels that encompass the detected body).

As another example, in addition or alternatively to the bounding shape, the person detection can indicate the location of the corresponding detected body through pose data describing a pose of the detected body. For example, the pose data can identify the location of one or more landmarks of the detected body. For example, the landmarks can include hand landmarks (e.g., fingers), arm landmarks (e.g., elbow, shoulder, etc.), torso landmarks (e.g., shoulder, waist, hips, chest, etc.), leg landmarks (e.g., feet, knees, thighs, etc.), neck landmarks, and head landmarks (e.g., eyes, nose, eyebrows, lips, chin, etc.). In some implementations, the pose data descriptive of the locations of the landmarks simply includes a number of points that correspond to the location of the landmarks. In other implementations, the pose data descriptive of the locations of the landmarks includes a stick figure representation of the body in which the various landmarks (e.g., hands, elbows, shoulders, etc.) are connected via edges. In addition to landmark locations, the body pose data can also describe various other characteristics of the detected body such as tilt, yaw, and/or roll angles of the body relative to a coordinate structure associated with the input imagery. The angles can be computed, for example, based on the locations of the landmarks relative to each other.

In some implementations, the person detection model can provide, for each person detection, a numerical value descriptive of a degree of confidence that the corresponding person detection is accurate (i.e., that the identified portion of the image in fact depicts a human body). The numerical value can be referred to as a confidence score. Typically, a larger confidence score indicates that the model is more confident in the prediction. In some examples, the confidence score(s) can range from 0 to 1.

As indicated above, in addition to the person detection model, the computing system can also include a face detection model. The face detection model can be configured (e.g., trained) to detect human faces depicted in images. That is, in contrast to the person detection model, the face detection model can be configured to search the image only for faces, without regard to the remainder of the body. Thus, given an input image, the face detection model can output one or more face detections, where each face detection indicates a respective detected face location of a respective detected face in the input image.

The location of the face can be indicated in a number of different ways. As one example, a face detection can indicate the location of the detected face as a bounding shape. The bounding shape can be a two-dimensional shape or a three-dimensional shape (e.g., depending on the dimensional structure of the input image). The bounding shape can identify a set of pixels (or voxels) in the imagery that correspond to the location of the face within the image. The bounding shape can be a polygonal shape (e.g., a box or cube), a curved shape (e.g., circle or oval), or an arbitrary shape (e.g., a segmentation mask that identifies a specific set of pixels or voxels that encompass the detected face).

As another example, in addition or alternatively to the bounding shape, the face detection can indicate the location of the corresponding detected face through pose data describing a pose of the face. For example, the pose data can identify the location of one or more facial landmarks of the detected face. For example, the facial landmarks can include eye landmarks, nose landmarks, eyebrows landmarks, lip landmarks, chin landmarks, or other facial landmarks. In some implementations, the pose data descriptive of the locations of the landmarks simply includes a number of points that correspond to the location of the landmarks. In other implementations, the pose data descriptive of the locations of the landmarks includes a connected representation of the face in which the various landmarks (e.g., all lip landmarks) are connected via edges. In addition to landmark locations, the facial pose data can also describe various other characteristics of the detected face such as tilt, yaw, and/or roll angles of the face relative to a coordinate structure associated with the input imagery. The angles can be computed, for example, based on the locations of the landmarks relative to each other.

In some implementations, the face detection model can provide, for each face detection, a numerical value descriptive of a degree of confidence that the corresponding face detection is accurate (i.e., that the identified portion of the image in fact depicts a human face). The numerical value can be referred to as a confidence score. Typically, a larger confidence score indicates that the model is more confident in the prediction. In some examples, the confidence score(s) can range from 0 to 1.

Thus, a computing system can obtain an input image and can input the input image into the person detection model and the face detection model to receive one or more person detections and one or more face detections, along with confidence scores indicating how confident the models are in their detections.

According to an aspect of the present disclosure, in some implementations, the person detection model and the face detection model can be included in a single, multi-headed model that includes a shared feature extraction portion, a person detection head, and a face detection head. Thus, the computing system can input the input image into the shared feature extraction portion. The shared feature extraction portion can extract one or more features from the input image. The shared feature extraction portion can supply the extracted features to each of the person detection head and the face detection head. The person detection head and the face detection head can separately process the extracted features to respectively generate the person detection(s) and the face detection(s).

In such fashion, the amount of processing needed to obtain both person detections and face detections from imagery can be reduced. That is, instead of running two separate models, as is typically performed, the single share feature extraction portion can be executed to extract features and then the two separate heads can operate on the shared features to perform separate person and face detection. Therefore, use of the single, multi-headed model can enable saving computing resources such as memory usage, processor usage, computing time, energy usage, and/or network usage.

In one example, each of the shared feature extraction portion, the person detection head, and the face detection head can be or include neural networks such as convolutional neural networks. For example, in some implementations, the shared feature extraction portion can be a convolutional neural network that includes one or more convolutions and each of the person detection head and the face detection head can be a feed forward neural network that includes one or more layer of neurons (e.g., only a single, final classification layer). Thus, in some implementations, a large majority of the processing effort is performed by the shared feature extraction portion, thereby capitalizing on the resource saving benefits described elsewhere herein (e.g., fewer floating point operations, less parameters, etc.) and essentially providing a "two-for-one" scenario in which two detections are provided by one model's worth of resource usage.

According to another aspect of the present disclosure, after receiving the person and face detections, the computing system can attempt to associate each face detection with one of the person detections, and vice versa. For example, when a face detection is associated with a person detection, it can generate a whole person detection, which can be referred to as an "appearance." As will be discussed further herein, the ability to associate the face detection with a person detection to generate an appearance can be used as a basis to screen (e.g., discard) certain face and/or person detections (e.g., those believed to be false positives).

In some implementations, the computing system can attempt, for each face detection, to iteratively match the face detection to one of the person detections until an approved association is found, or vice versa. As one example, for each face detection, the computing system can identify any person detections that are within a threshold distance (e.g., based on a comparison of their respective locations) and can try to associate the face detection with one of the identified person detections (e.g., starting with the closest). In other implementations, only a fixed number (e.g., one) of the closest person detections are analyzed for each face detection.

In some implementations, the association analysis can be performed on the basis of the location and/or pose data associated with the detections. For example, the computing system can apply a set of rules or criteria to determine whether a face detection should be associated with a person detection, or vice versa.

As one example, a face detection can be matched with a person detection if they are within a certain distance of each other (e.g., their centroids are within a certain distance). As another example, a face detection can be matched with a person detection if their respective bounding shapes (e.g., bounding boxes, semantic segmentations, etc.) have an amount of overlap that exceeds a threshold. For example, the amount of overlap can be measured as a percentage of the entire face bounding shape.

As another example, the pose data for the face and person detections can be compared to determine whether an association is appropriate. For example, as described above, the face detection can indicate one or more facial landmark locations associated with one or more facial landmarks (e.g., eyes, lips, ears, nose, chin, brow, etc.). Similarly, the person detection can also indicate one or more facial landmark locations associated with the one or more facial landmarks. In some implementations, comparing the respective sets of pose data from the face and person detections can include determining a respective distance between each pair of corresponding landmark locations respectively provided by the face and person detections. For example, a distance (e.g., normalized distance) can be evaluated between the "center upper lip" landmark location provided by the face detector and the "center upper lip" landmark location provided by the person detector. The same operation can be performed for all pairs of matching landmarks (or even non-matching landmarks if some relationship is desired to be evaluated). The computing system can determine whether to associate the face detection with the person detection based on such computed distance(s).

As one specific and non-limiting example provided for illustrative purposes only, an association score for a given face detection ($f_i$) and person detection ($p_j$) can be computed as follows:

$$\text{score}_{f_i, p_j} = \exp\left(-\sum_{f_i^m \in (f_i \cap p_j)} \frac{\|f_i^m - p_j^m\|}{\|f_i^m - f_i^c\|}\right)$$

where $f_i^m \in (f_i \cap p_j)$ indicates any landmark location $f_i^m$ given by the face detection $f_i$ for which the person detection $p_j$ also provides a respective landmark location $p_j^m$ and where $f_i^c$ indicates a centroid of all landmarks $f_i^m \in (f_i \cap p_j)$. The score $_{f_i, p_j}$ can be compared to a threshold value to determine whether to associate the face detection $f_i$ with the person detection $p_j$.

Various combinations of the above rules and criteria can be applied as well. A cumulative score across multiple measures of association can be computed and compared to a threshold value. In some implementations, the computer system elects to associate the face detection with the person detection that both (1) has a score that exceeds a threshold value and (2) has the highest score out of all assessed person detections. However, other, different sets of criteria can be applied, as well. As one example, the Hungarian Algorithm can be used to solve for the best overall assignments. This optimal solution can sometimes need to assign, for example, a face to a person assignment that is not the highest score because of another face might have a better match. In some implementations, the problem can be approached as an instance of the "linear assignment problem."

According to an aspect of the present disclosure, after attempting to associate each face detection with one of the person detection(s), or vice versa, the computing system can screen the facial detections in an attempt to remove false positives. In particular, the computing system can intelligently screen each face detection on the basis of whether or not the face detection was able to be associated with one of the person detection(s).

More particularly, as part of the screening process, the respective confidence score associated with each face detection can be compared to a confidence threshold to determine whether to retain or discard the face detection. As one specific and non-limiting example, the confidence threshold could be set to 0.5, such that, absent any alteration of the confidence scores or thresholds, face detections with corresponding confidence scores less than 0.5 are discarded while face detections with corresponding confidence scores greater than 0.5 are retained. The threshold of 0.5 is provided as an example. Any different threshold can be used, for example, to trade-off between false positives and false negatives.

However, according to an aspect of the present disclosure, the confidence scores and/or thresholds can be modified based on associations as described above. In particular, in some implementations, for each face detection that was successfully associated with one of the person detections, the computing system can increase a confidence score associated with such face detection and/or can decrease a confidence threshold associated with screening such face detection (e.g., from 0.5 to any smaller threshold, including, for example, a threshold of zero). Alternatively or additionally, for each face detection that was not successfully associated with one of the person detections, the computing system can decrease a confidence score associated with such face detection and/or can increase a confidence threshold associated with screening such face detection.

There are several different ways in which the increasing or updating of confidence values can be performed. As one example, the maximum value can be taken between associated face and person detections. To provide an example, a face detection may have 0.4 confidence and a person detection may have 0.8 confidence. If these two detections are associated, the face confidence can be updated to 0.8. As another example, a Bayes formula can be used. The Bayes formula can consider the odds that both of the detections are wrong. To continue the example, the face detection and/or person detection confidence can be set to 0.88 due to the following formulation: $1.0-(1-0.4)*(1-0.8)=0.88$. In yet another example, an additional model could be trained to handle confidence value updating. For example, the model can take as inputs the face and person detection confidence values and an corresponding association score. The model can have a target output of 1 if the face is a true positive and a target output of 0 if the face is false positive. The updated confidence value for the face can be the output of this additional model. Similar examaples can be done for reducing confidence values too, for example, when there is no corroborating person detection.

Thus, systems and methods of the present disclosure can use the juxtapositions of face and person detections to adjust the confidence scores and/or corresponding thresholds. For example, a low confidence face detection that is able to be associated with a person detection can instead be viewed as high confidence that a face is there. However, if a low confidence face detection is not able to be associated with a person detection, its confidence can be reduced (or, alternatively, not increased). In such fashion, multiple detection types within an image can be combined to reduce the number of false positive face detections, thereby improving the precision of the face detections.

The screening techniques described herein as applied to screening face detections are equally able to be applied to screen person detections. For example, for each person detection that was successfully associated with one of the face detections, the computing system can increase a confidence score associated with such person detection and/or can decrease a confidence threshold associated with screening the person detection. Alternatively or additionally, for each person detection that was not successfully associated with one of the face detections, the computing system can decrease a confidence score associated with such person detection and/or can increase a confidence threshold associated with screening the such person detection.

According to another aspect of the present disclosure, in addition or alternatively to screening the detections, a computing system can hallucinate face detections based on unassociated person detections, or vice versa. For example, for a particular person detection (e.g., a person detection to which no face detection was associated after performing the association process described above), the computing system can generate a hallucinated face detection based at least in part on the detected body location of the detected human body provided by the person detection. The hallucinated face detection can indicate a hallucinated face location in the input image of a face associated with the detected human body.

In particular, in some implementations, the location and/or pose information provided by a person detection can be used to generate the hallucinated face detection. As an example, as described above, in some implementations, the person detection can describe one or more body pose landmarks respectively associated with one or more body components of the detected human body. In such implementations, generating the hallucinated face detection based at least in part on the detected body location of the detected human body can include generating one or more hallucinated face pose landmarks based at least in part on the one or more body pose landmarks. For example, the body pose landmarks of the person detection can specifically include facial landmarks and, in such instances, the facial landmarks can be directly used to generate the hallucinated face pose landmarks. In other implementations, the body pose landmarks of the person detection may include only landmarks associated with a torso or limbs of the body and generating the hallucinated face pose landmarks can include projecting a body map (e.g., that includes information about typical spacing between various body landmarks) onto the torso or limb landmarks to identify the hallucinated face pose landmarks. Geometry processing can be performed to determine the extent or boundaries of the hallucinated face and/or other information such as facial pose information.

In some implementations, the computing system can choose to keep only hallucinated faces that satisfy certain characteristics or criteria. As one example, to be retained, a hallucinated face detection may be required to or have head pose within a relatively narrow frontal window. For example, the yaw, pitch, and/or roll angles associated with a hallucinated face may be required to be within approved ranges (e.g., 30 degrees from nominal) in order for the hallucinated face to be retained.

In some implementations, faces can be hallucinated for any person detection that does not have an associated face detection. In other implementations, faces can be hallucinated only for person detection(s) that (1) do not have an associated face detection and (2) have a confidence score greater than some threshold value. Each hallucinated face can then be associated with the corresponding person detection to generate a whole person detection or "appearance."

In such fashion, the computing system can hallucinate faces for un-associated person detections. This can reduce false negative face detections, in which a face is depicted in the image but not identified by the face detector (e.g., which can occur when a face is highly backlit or the face is partially occluded). Thus, recall exhibited by the final face detections (e.g., inclusive of the hallucinated faces) can be boosted by combining evidence from multiple detection types in the same image (or across multiple images). Improving recall of the face detection can also provide the benefit of saving computing resources. Stated differently, because hallucination of faces as described herein results in more face detections occurring overall, the face detection model may not need to be run on as many frames to achieve the same results, particularly when detections are tracked across frames. Thus, fewer executions of the model(s) overall results in saved resources such as saved memory usage, processor usage, etc.

In some implementations, the whole person detection described above can be an initial stage in a larger process that includes a number of downstream actions performed after detection of the person or face, such as, for example, recognizing the face (e.g., to unlock a mobile device, to interpret a command, to cluster or search for photographs in a photograph management application), detecting a gaze direction associated with the human (e.g., to understand a subject of a verbal command issued by the human), or other activities.

As one example, recognizing the face can include using the face bounding shape and/or the landmarks to select a region of the image (e.g., the region within the shape or a tweaked shape that has been rotated, scaled, etc.); processing the image region with a network that produces an embedding (see, e.g., the FaceNet model); and using that embedding to compare to a set of embeddings in a Gallery (e.g., pre-registered) to see if there is a match (e.g., based on distance within the embedding space).

Thus, in some examples, a portion of an image that corresponds to a hallucinated face detection can be cropped and sent to a downstream model (e.g., facial recognition model and/or gaze detection model) for processing. As such, the face hallucination enables application of face-related technologies to specific portions of an image, rather than the image as a whole, which results in savings of processing time, computational power, memory usage, etc. In particular, example experiments have successfully applied face recognition technologies to these 'hallucinated' faces and demonstrated improvement in certain overall metrics such as number of frames in which in individual is correctly recognized.

Furthermore, although the techniques have heretofore been described as applied to a single input image, the described techniques are also applicable to and provide benefits for detection of whole persons across multiple related image frames such as found in movies. For example, whole person detections or corresponding associations can be carried forward from a first image to a subsequent image to perform whole person tracking over plural image frames. Associations can be propagated frame to frame or can associated directly with the face of a person across frames. In addition to tracking whole persons across multiple frames, the whole person detections or corresponding associations can be used to carry attention information from one frame to the next.

In some implementations, to perform propagation of associations across images, each detection can include an "anchor" that ties it to other detections (e.g., a face and person detection both have anchors that tie them to the same person). In some implementations, the anchor can be associated with certain landmarks. Alternatively or additionally, the detectors themselves can be configured (e.g., trained) to produce a key or embedding that matches across the objects.

Thus, aspects of the present disclosure operate in situations where one or more detectors provide both person detections and face detections. In this case, a single human in the scene can have multiple corresponding detections in a frame. The systems of the present disclosure can estimate the association strength between face and person detections within a frame using landmarks, as well as associations across frames.

The various thresholds described herein can be manually set or can be learned based on training data. The various thresholds described herein can be fixed or can be adaptive based on various characteristics such as, for example, image resolution, image lighting, manual tuning to control tradeoffs (e.g., precision vs. recall), confidence values associated with the face detection and/or person detection, etc.

With reference now to the Figures, example embodiments of the present disclosure will be discussed in further detail.

Example Devices and Systems

FIG. 1A depicts a block diagram of an example computing system 100 that performs whole person association according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

Figure 2:
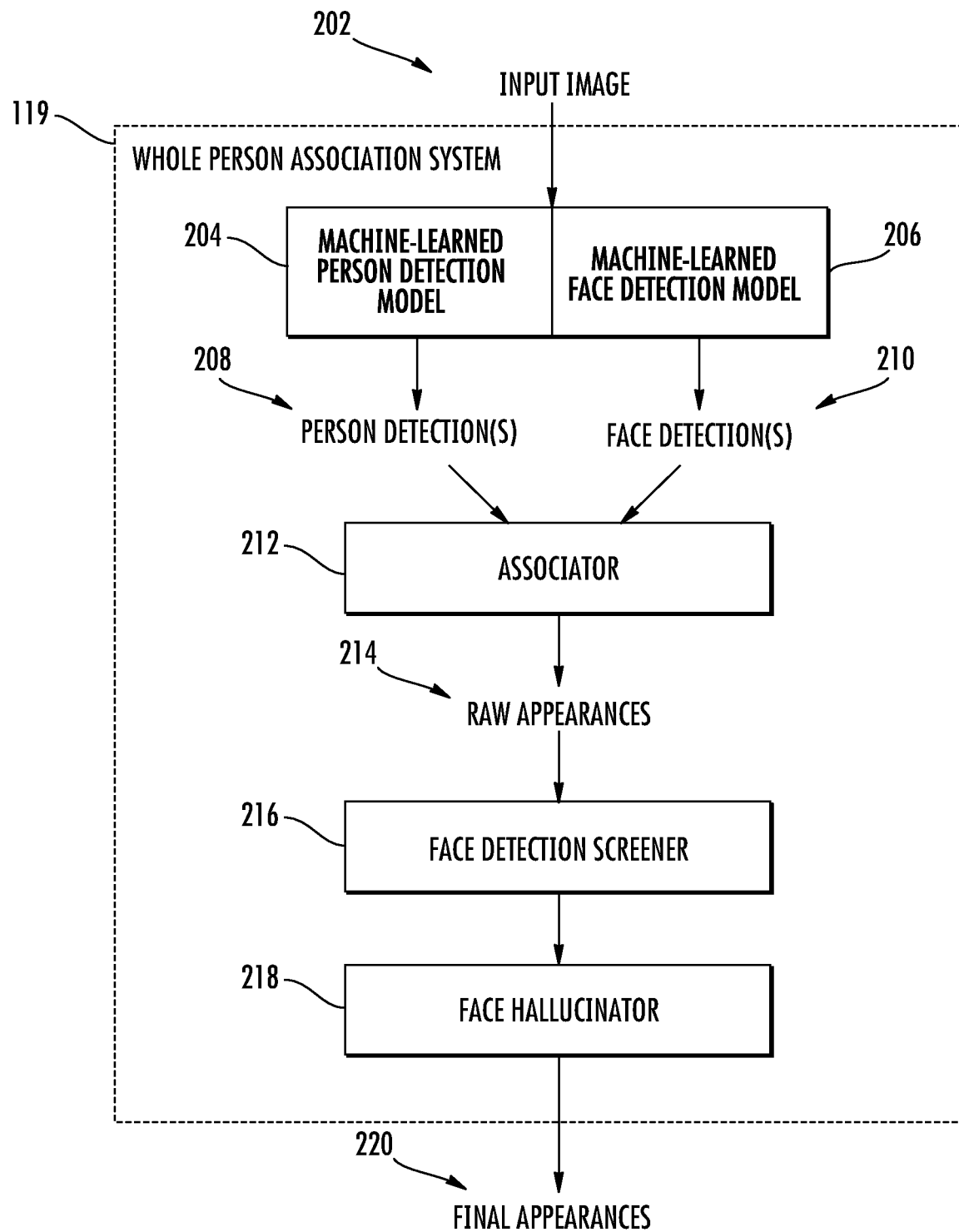
FIG. 2 depicts a block diagram of an example processing pipeline according to example embodiments of the present disclosure.

The user computing device 102 can include a whole person association system 119. The whole person association system 119 can perform whole person detection/association as described herein. One example of the whole person association system 119 is shown in FIG. 2. However, systems other than the example system shown in FIG. 2 can be used as well.

In some implementations, the whole person association system 119 can store or include one or more face and/or person detection models 120. For example, the face and/or person detection models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

Figure 3:
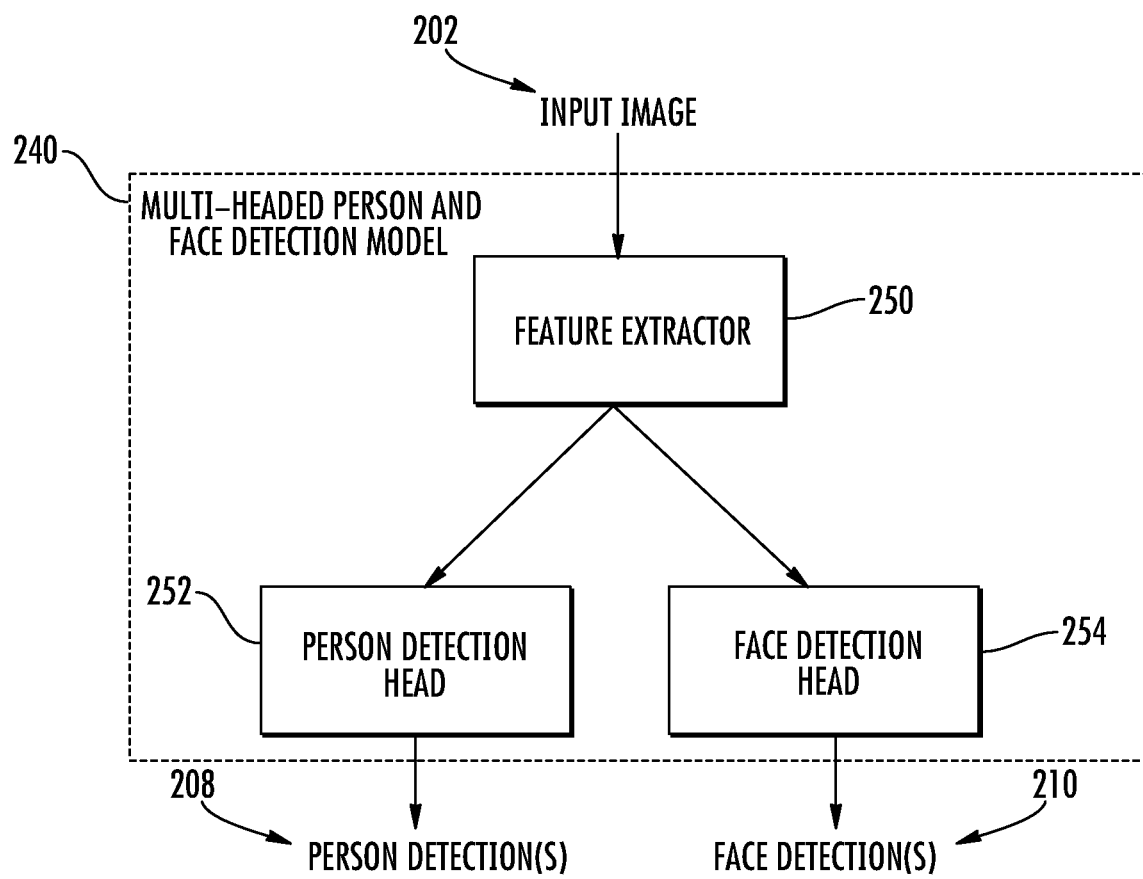
FIG. 3 depicts a block diagram of an example multi-headed person and face detection model.

One example multi-headed person and face detection model 240 is discussed with reference to FIG. 3. However, the example model 240 is provided as one example only. The models 120 can be similar to or different from the example model 240.

In some implementations, the one or more face and/or person detection models 120 can be received from the server computing system 130 over network 180, stored in the user computing device memory 114, and then used or otherwise implemented by the one or more processors 112. In some implementations, the user computing device 102 can implement multiple parallel instances of face and person detection model(s) 120 (e.g., to perform parallel face and/or person detection across multiple instances of input imagery).

Additionally or alternatively to the whole person association system 119, the server computing system 130 can include a whole person association system 139. The whole person association system 139 can perform whole person detection/association as described herein. One example of the whole person association system 139 can be the same as the system shown in FIG. 2. However, systems other than the example system shown in FIG. 2 can be used as well.

Additionally or alternatively to the models 120, one or more face and/or person detection models 140 can be included in or otherwise stored and implemented by the server computing system 130 (e.g., as a component of the whole person association system 139) that communicates with the user computing device 102 according to a client-server relationship. For example, the face and/or person detection models 140 can be implemented by the server computing system 140 as a portion of a web service (e.g., an image processing service). Thus, one or more models 120 can be stored and implemented at the user computing device 102 and/or one or more models 140 can be stored and implemented at the server computing system 130. The one or more face and/or person detection models 140 can be the same as or similar to the models 120.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned face and/or person detection models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. One example model 140 is discussed with reference to FIG. 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the face and/or person detection models 120 and/or 140 based on a set of training data 162. The training data 162 can include, for example, a plurality of training images, where each training image has been labeled with ground truth face and/or person detections. For example, the label(s) for each training image can describe the location (e.g., in the form of a bounding shape) and/or pose (e.g., landmark locations) of a face and/or person depicted by the training image. In some implementations, the labels can be manually applied to the training images by humans. In some implementations, the models can be trained using a loss function that measures a difference between a predicted detection and a ground-truth detection. In implementations which include multi-headed models, the multi-headed models can be trained using a combined loss function that combines a loss at each head. For example, the combined loss function can sum the loss from the face detection head with the loss from the person detection head to form a total loss. The total loss can be backpropagated through the model.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
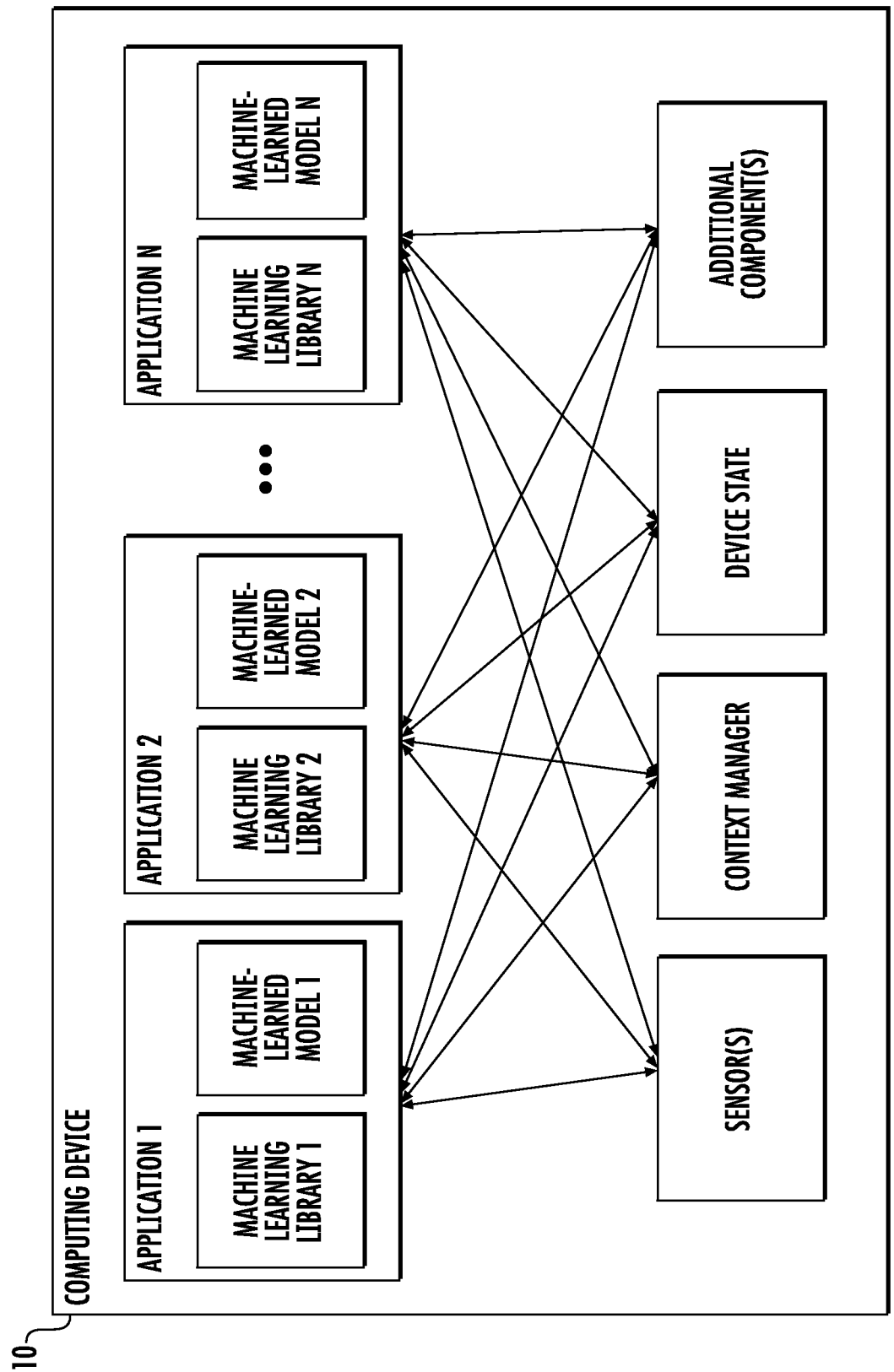
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
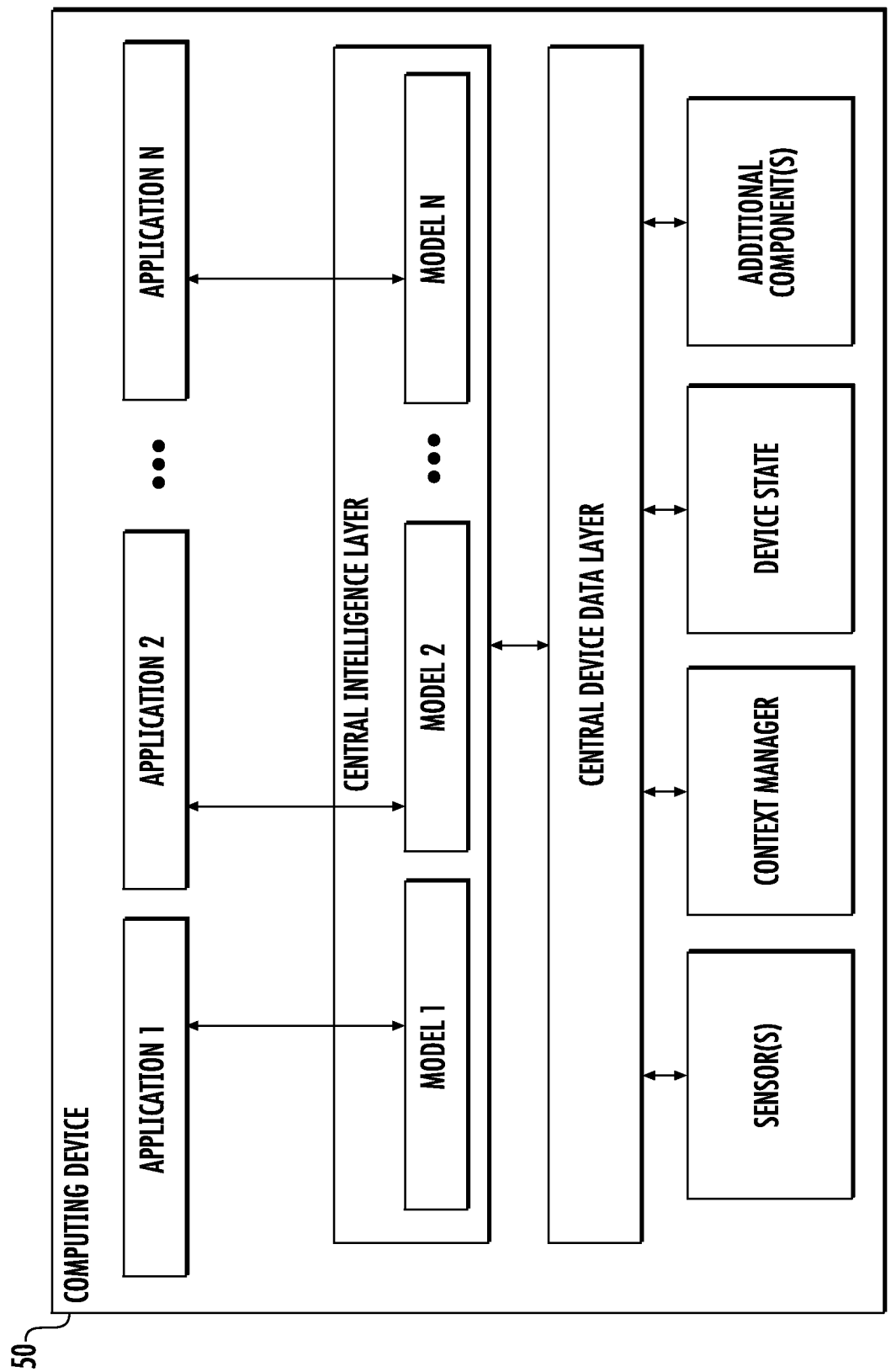
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2 depicts a block diagram of an example processing pipeline according to example embodiments of the present disclosure. The processing pipeline can be performed by the whole person association system 119. The processing pipeline of FIG. 2 will be discussed with reference to FIGS. 4A-G, which depict example images with detections illustrating application of the example processing pipeline of FIG. 2. These images are provided as examples only.

Referring still to FIG. 2, the whole person association system 119 can include both a person detection model 204 and a face detection model 206. In some implementations, the person detection model 204 and/or the face detection model 206 can be machine-learned models, such as, for example, artificial neural networks (hereinafter "neural networks") such as convolutional neural networks.

Each of the person detection model 204 and the face detection model 206 can be configured to process an input image 202. The input image 202 can include two-dimensional imagery or three-dimensional imagery. For example, the input image 202 can be an image captured by a camera (e.g., visible spectrum camera, infrared camera, hyperspectral camera, etc.). The input image 202 can be expressed in any number of different color spaces (e.g., greyscale, RGB, CMYK, etc.). As another example, the input image 202 can include imagery generated by a Light Detection and Ranging ("LIDAR") system or a Radio Detection and Ranging ("RADAR") system. For example, the input image 202 can be or include a two- or three-dimensional point cloud of detected data points.

The person detection model 204 can be configured (e.g., trained) to detect human bodies depicted in images. For example, the person detection model 204 can be configured to look for a majority of a human body (e.g., including the torso, head, and limbs) and not just the face. Thus, given an input image, the person detection model 204 can output one or more person detections 208, where each person detection 208 indicates a respective detected body location of a respective detected human body in the input image 202.

The location of the human body can be indicated in a number of different ways. As one example, a person detection 208 can indicate the location of the detected body as a bounding shape. The bounding shape can be a two-dimensional shape or a three-dimensional shape (e.g., depending on the dimensional structure of the input image). The bounding shape can identify a set of pixels (or voxels) in the imagery that correspond to the location of the body within the image. The bounding shape can be a polygonal shape (e.g., a box or cube), a curved shape (e.g., circle or oval), or an arbitrary shape (e.g., a segmentation mask that identifies a specific set of pixels or voxels that encompass the detected body).

As another example, in addition or alternatively to the bounding shape, the person detection 208 can indicate the location of the corresponding detected body through pose data describing a pose of the detected body. For example, the pose data can identify the location of one or more landmarks of the detected body. For example, the landmarks can include hand landmarks (e.g., fingers), arm landmarks (e.g., elbow, shoulder, etc.), torso landmarks (e.g., shoulder, waist, hips, chest, etc.), leg landmarks (e.g., feet, knees, thighs, etc.), neck landmarks, and head landmarks (e.g., eyes, nose, eyebrows, lips, chin, etc.). In some implementations, the pose data descriptive of the locations of the landmarks simply includes a number of points that correspond to the location of the landmarks. In other implementations, the pose data descriptive of the locations of the landmarks includes a stick figure representation of the body in which the various landmarks (e.g., hands, elbows, shoulders, etc.) are connected via edges. In addition to landmark locations, the body pose data can also describe various other characteristics of the detected body such as tilt, yaw, and/or roll angles of the body relative to a coordinate structure associated with the input image 202. The angles can be computed, for example, based on the locations of the landmarks relative to each other.

In some implementations, the person detection model 204 can provide, for each person detection 208, a numerical value descriptive of a degree of confidence that the corresponding person detection 208 is accurate (i.e., that the identified portion of the image in fact depicts a human body). The numerical value can be referred to as a confidence score. Typically, a larger confidence score indicates that the model is more confident in the prediction. In some examples, the confidence score(s) can range from 0 to 1.

As indicated above, in addition to the person detection model 204, the whole person association system 119 can also include a face detection model 206. The face detection model 206 can be configured (e.g., trained) to detect human faces depicted in images. That is, in contrast to the person detection model 204, the face detection model 206 can be configured to search the image only for faces, without regard to the remainder of the body. Thus, given an input image, the face detection model 206 can output one or more face detections 210, where each face detection 210 indicates a respective detected face location of a respective detected face in the input image.

The location of the face can be indicated in a number of different ways. As one example, a face detection 210 can indicate the location of the detected face as a bounding shape. The bounding shape can be a two-dimensional shape or a three-dimensional shape (e.g., depending on the dimensional structure of the input image). The bounding shape can identify a set of pixels (or voxels) in the imagery that correspond to the location of the face within the image. The bounding shape can be a polygonal shape (e.g., a box or cube), a curved shape (e.g., circle or oval), or an arbitrary shape (e.g., a segmentation mask that identifies a specific set of pixels or voxels that encompass the detected face).

As another example, in addition or alternatively to the bounding shape, the face detection 210 can indicate the location of the corresponding detected face through pose data describing a pose of the face. For example, the pose data can identify the location of one or more facial landmarks of the detected face. For example, the facial landmarks can include eye landmarks, nose landmarks, eyebrows landmarks, lip landmarks, chin landmarks, or other facial landmarks. In some implementations, the pose data descriptive of the locations of the landmarks simply includes a number of points that correspond to the location of the landmarks. In other implementations, the pose data descriptive of the locations of the landmarks includes a connected representation of the face in which the various landmarks (e.g., all lip landmarks) are connected via edges. In addition to landmark locations, the facial pose data can also describe various other characteristics of the detected face such as tilt, yaw, and/or roll angles of the face relative to a coordinate structure associated with the input imagery. The angles can be computed, for example, based on the locations of the landmarks relative to each other.

In some implementations, the face detection model 206 can provide, for each face detection 210, a numerical value descriptive of a degree of confidence that the corresponding face detection is accurate (i.e., that the identified portion of the image in fact depicts a human face). The numerical value can be referred to as a confidence score. Typically, a larger confidence score indicates that the model is more confident in the prediction. In some examples, the confidence score(s) can range from 0 to 1.

Thus, the whole person association system 119 can obtain an input image 202 and can input the input image 202 into the person detection model 204 and the face detection model 206 to receive one or more person detections 208 and one or more face detections 210, along with confidence scores indicating how confident the models are in their detections.

Figure 4A:
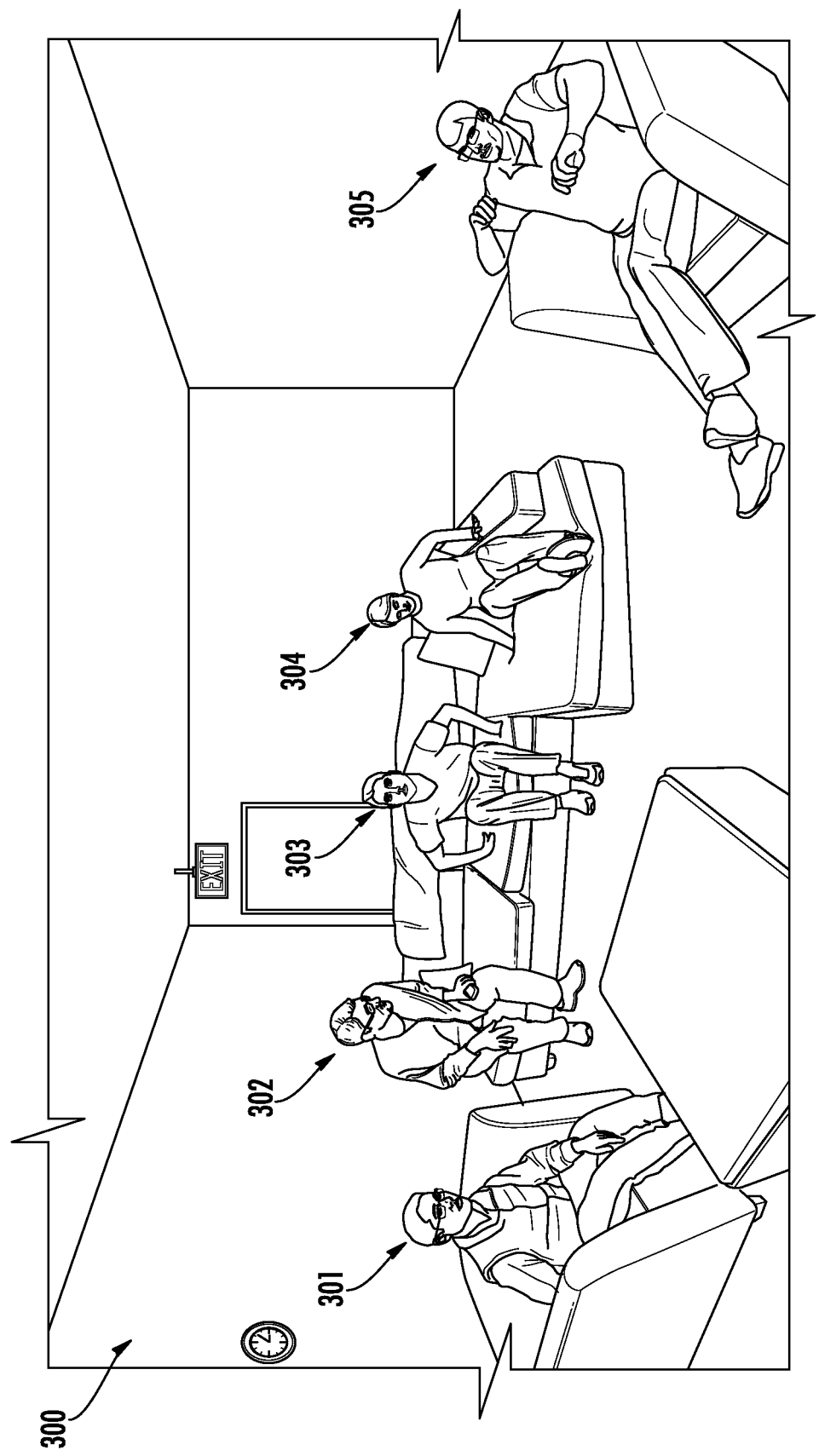
FIGS. 4A-G depict example images with detections illustrating application of the example processing pipeline of FIG. 2.
Figure 4B:
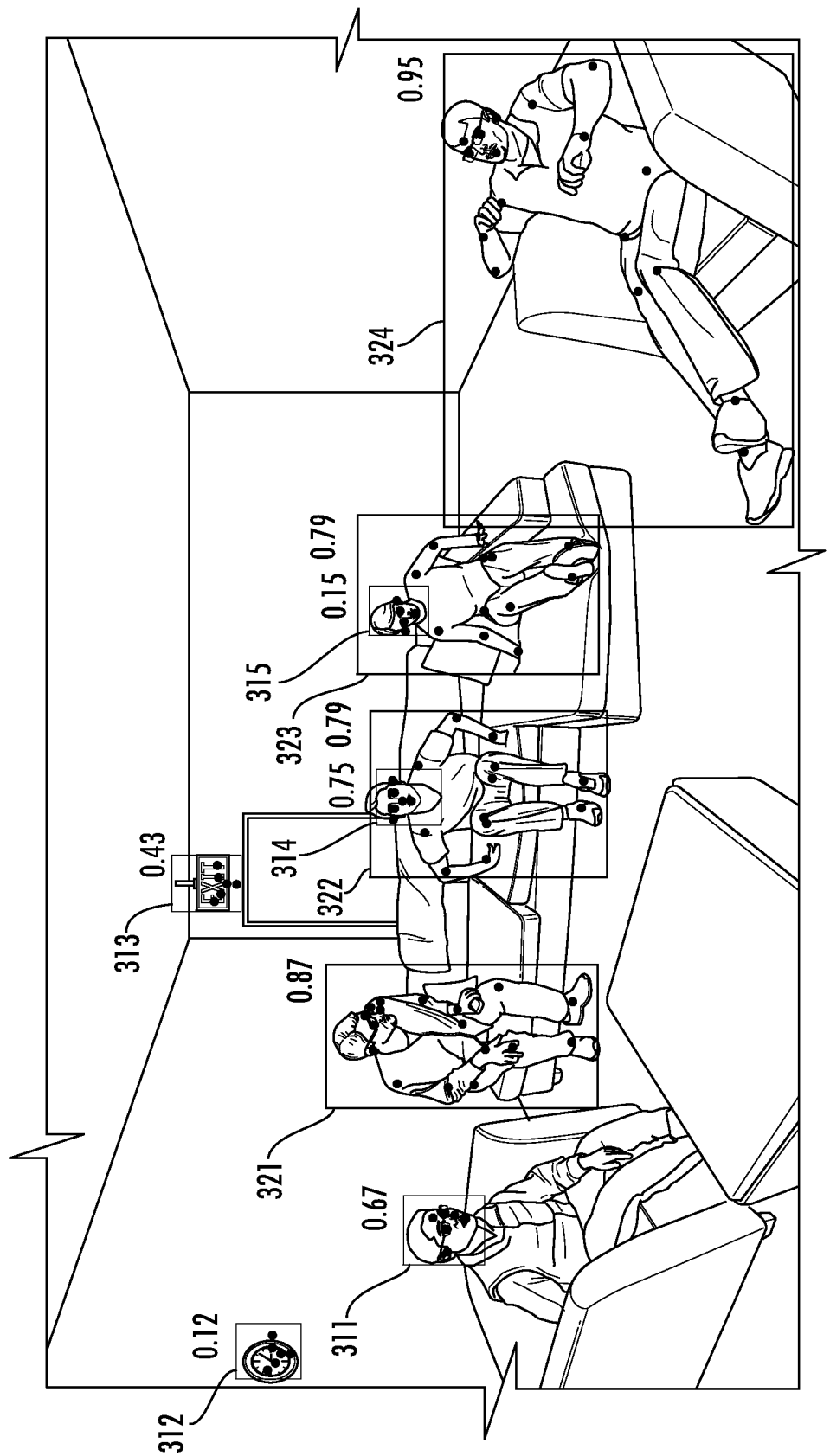

To provide an example, FIG. 4A shows an example input image 300. The image 300 depicts five humans, which are respectively labeled as 301-305. Referring now to FIG. 4B, a number of face and person detections have been generated from the input image 300. For example, face detections 311, 312, 313, 314, and 315 have been generated and person detections 321, 322, 323, and 324 have been generated. Each of the face detections 311-315 and person detections 321-324 provides a bounding shape (here a bounding box) and has a corresponding confidence score provided adjacent to the bounding shape. As can be seen, the face detections 311-315 contain some errors. For example, face detections 312 and 313 have been erroneously generated for portions of the image that depict a clock and an exit sign, respectively. On the other hand, face detections were erroneously missed for the faces of human 302 and human 305.

Referring again to FIG. 2, according to an aspect of the present disclosure, in some example implementations, the person detection model 204 and the face detection model 206 can be included in a single, multi-headed model that includes a shared feature extraction portion, a person detection head, and a face detection head. FIG. 3 depicts a block diagram of an example of such a multi-headed person and face detection model 240. The model 240 can include a shared feature extraction portion 250, a person detection head 252, and a face detection head 254. As used in this context, the term "head" refers to a portion of the model architecture, not the physical head of a human being.

The input image 202 can be input into the shared feature extraction portion 250. The shared feature extraction portion 250 can extract one or more features from the input image. The shared feature extraction portion 250 can supply the extracted features to each of the person detection head 252 and the face detection head 254. The person detection head 254 and the face detection head 254 can separately process the extracted features to respectively generate the person detection(s) 208 and the face detection(s) 210.

In such fashion, the amount of processing needed to obtain both person detections 208 and face detections 210 from the input image 202 can be reduced. That is, instead of running two separate models, as is typically performed, the single share feature extraction portion 250 can be executed to extract features and then the two separate heads 252 and 254 can operate on the shared features to perform separate person and face detection. Therefore, use of the single, multi-headed model 240 can enable saving computing resources such as memory usage, processor usage, computing time, energy usage, and/or network usage.

In one example, each of the shared feature extraction portion 250, the person detection head 252, and the face detection head 254 can be or include neural networks such as convolutional neural networks. For example, in some implementations, the shared feature extraction portion 250 can be a convolutional neural network that includes one or more convolutions and each of the person detection head 252 and the face detection head 254 can be a feed forward neural network that includes one or more layer of neurons (e.g., only a single, final classification layer). Thus, in some implementations, a large majority of the processing effort is performed by the shared feature extraction portion 250, thereby capitalizing on the resource saving benefits described elsewhere herein (e.g., fewer floating point operations, less parameters, etc.) and essentially providing a "two-for-one" scenario in which two detections 208 and 210 are provided by one model's worth of resource usage.

Referring again to FIG. 2, according to another aspect of the present disclosure, after receiving the person and face detections, an associator 212 can attempt to associate each face detection 210 with one of the person detections 208, and/or vice versa. For example, when a face detection 210 is associated with a person detection 208, it can generate a whole person detection, which can be referred to as an "appearance" 214. As will be discussed further herein, the ability to associate the face detection 210 with a person detection 208 to generate an appearance 214 can be used as a basis to screen (e.g., discard) certain face detections 210 (e.g., those believed to be false positives).

In some implementations, the associator 212 can attempt, for each face detection 210, to iteratively match the face detection 210 to one of the person detections 208 until an approved association is found, or vice versa. As one example, for each face detection 210, the associator 212 can identify any person detections 208 that are within a threshold distance (e.g., based on a comparison of their respective locations) and can try to associate the face detection 210 with one of the identified person detections 208 (e.g., starting with the closest). In other implementations, only a fixed number (e.g., one) of the closest person detections 208 are analyzed for each face detection 210.

In some implementations, the association analysis can be performed on the basis of the location and/or pose data associated with the detections. For example, the associator 212 can apply a set of rules or criteria to determine whether a face detection 210 should be associated with a person detection 208, or vice versa.

As one example, a face detection 210 can be matched with a person detection 208 if they are within a certain distance of each other (e.g., their centroids are within a certain distance). For example, distance can be measured in pixels, or measured as, for example, a percentage of the face width (e.g., to normalize so that the size of the person in pixels does not matter).

As another example, a face detection 210 can be matched with a person detection 208 if their respective bounding shapes (e.g., bounding boxes, semantic segmentations, etc.) have an amount of overlap that exceeds a threshold. For example, the amount of overlap can be measured as a percentage of the entire face bounding shape.

As another example, the pose data for the face and person detections 210, 208 can be compared to determine whether an association is appropriate. For example, as described above, the face detection 210 can indicate one or more facial landmark locations associated with one or more facial landmarks (e.g., eyes, lips, ears, nose, chin, brow, etc.). Similarly, the person detection 208 can also indicate one or more facial landmark locations associated with the one or more facial landmarks. In some implementations, comparing the respective sets of pose data from the face and person detections can include determining a respective distance between each pair of corresponding landmark locations respectively provided by the face and person detections. For example, a distance (e.g., normalized distance) can be evaluated between the "center upper lip" landmark location provided by the face detection 210 and the "center upper lip" landmark location provided by the person detection 208. The same operation can be performed for all pairs of matching landmarks (or even non-matching landmarks if some relationship is desired to be evaluated). The associator 212 can determine whether to associate the face detection 210 with the person detection 208 based on such computed distance (s).

As one specific and non-limiting example provided for illustrative purposes only, an association score for a given face detection ($f_i$) and person detection ($p_j$) can be computed as follows:

$$\text{score}_{f_i, p_j} = \exp\left(-\sum_{f_i^m \in (f_i \cap p_j)} \frac{\|f_i^m - p_j^m\|}{\|f_i^m - f_i^c\|}\right)$$

where $f_i^m \in (f_i \cap p_j)$ indicates any landmark location $f_i^m$ given by the face detection $f_i$ for which the person detection $p_j$ also provides a respective landmark location $p_j^m$ and where $f_i^c$ indicates a centroid of all landmarks $f_i^m \in (f_i \cap p_j)$. The $\text{score}_{fi, pj}$ can be compared to a threshold value to determine whether to associate the face detection $f_i$ with the person detection $p_j$ Various combinations of the above rules and criteria can be applied as well. A cumulative score across multiple measures of association can be computed and compared to a threshold value. The multiple measures can be weighted against each other. In some implementations, the associator 212 elects to associate the face detection with the person detection that both (1) has a score that exceeds a threshold value and (2) has the highest score out of all assessed person detections. However, other, different sets of criteria can be applied.

Figure 4C:
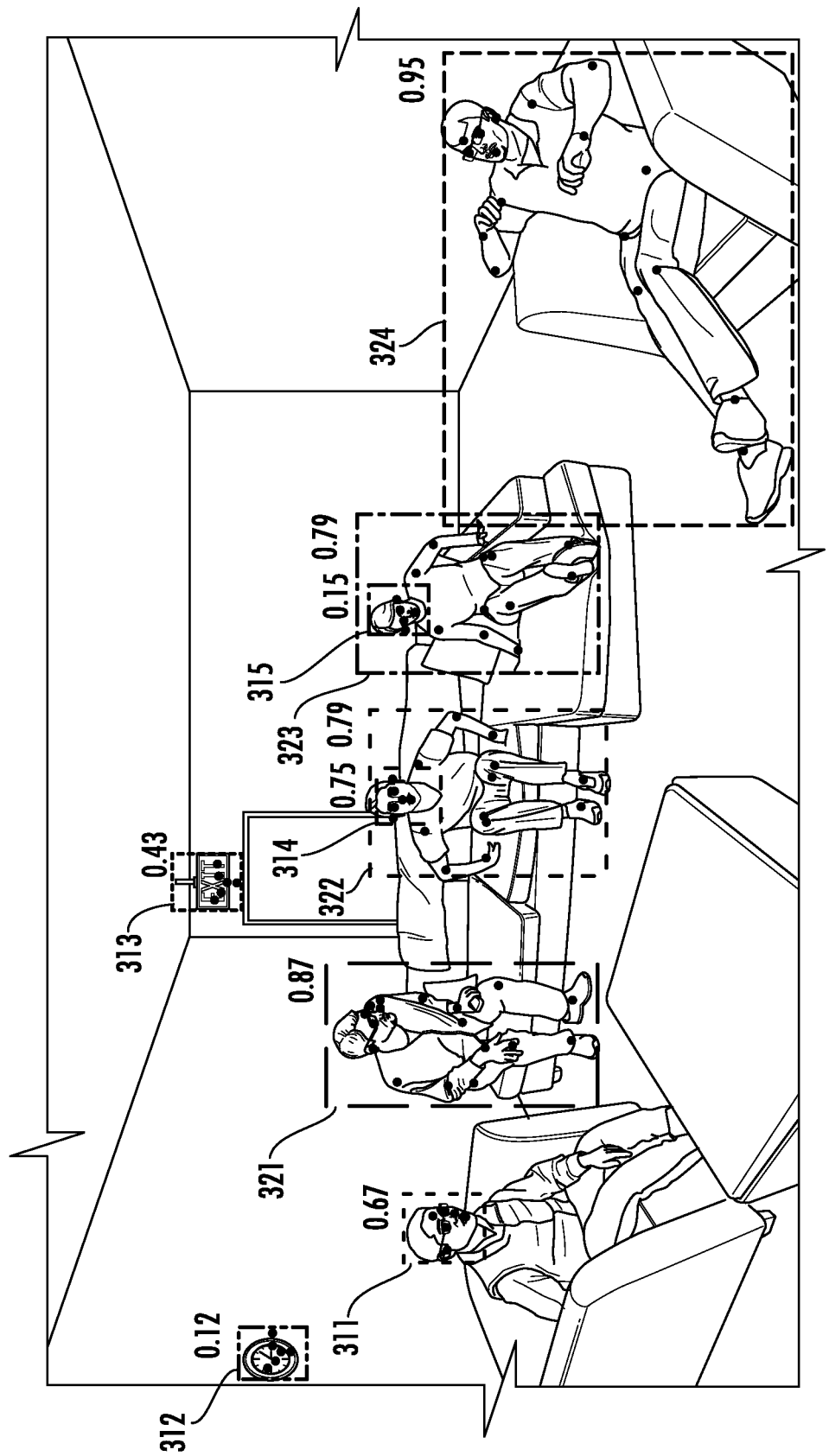

To provide an example, FIG. 4C provides some examples of some whole person detections or appearances. For example, face detection 314 and person detection 322 have been associated to form an appearance. Similarly, face detection 315 and person detection 323 have been associated to form another appearance of a different individual. However, none of face detections 311, 312, and 313 and person detections 321 and 324 have been associated with a counterpart.

Referring again to FIG. 2, according to an aspect of the present disclosure, after attempting to associate each face detection with one of the person detection(s), or vice versa, a face detection screener 216 can screen the facial detections in an attempt to remove false positives. In particular, the face detection screener 216 can intelligently screen each face detection on the basis of whether or not the face detection was able to be associated with one of the person detection(s).

More particularly, as part of the screening process, the respective confidence score associated with each face detection 210 can be compared to a confidence threshold to determine whether to retain or discard the face detection 210. As one specific and non-limiting example, the confidence threshold could be set to 0.5, such that, absent any alteration of the confidence scores or thresholds, face detections 210 with corresponding confidence scores less than 0.5 are discarded while face detections 210 with corresponding confidence scores greater than 0.5 are retained.

However, according to an aspect of the present disclosure, the confidence scores and/or thresholds can be modified based on associations as described above. In particular, in some implementations, for each face detection 210 that was successfully associated with one of the person detections 208, the face detection screener 216 can increase a confidence score associated with such face detection 210 and/or can decrease a confidence threshold associated with screening such face detection 210. Alternatively or additionally, for each face detection 210 that was not successfully associated with one of the person detections 208, the face detection screener 216 can decrease a confidence score associated with such face detection 210 and/or can increase a confidence threshold associated with screening such face detection 210.

Thus, systems and methods of the present disclosure can use the juxtapositions of face and person detections to adjust the confidence scores and/or corresponding thresholds. For example, a low confidence face detection 210 that is able to be associated with a person detection 208 can instead be viewed as high confidence that a face is there. However, if a low confidence face detection 210 is not able to be associated with a person detection 208, its confidence can be reduced (or, alternatively, not increased). In such fashion, multiple detection types within an image can be combined to reduce the number of false positive face detections, thereby improving the precision of the face detections 210.

Figure 4D:
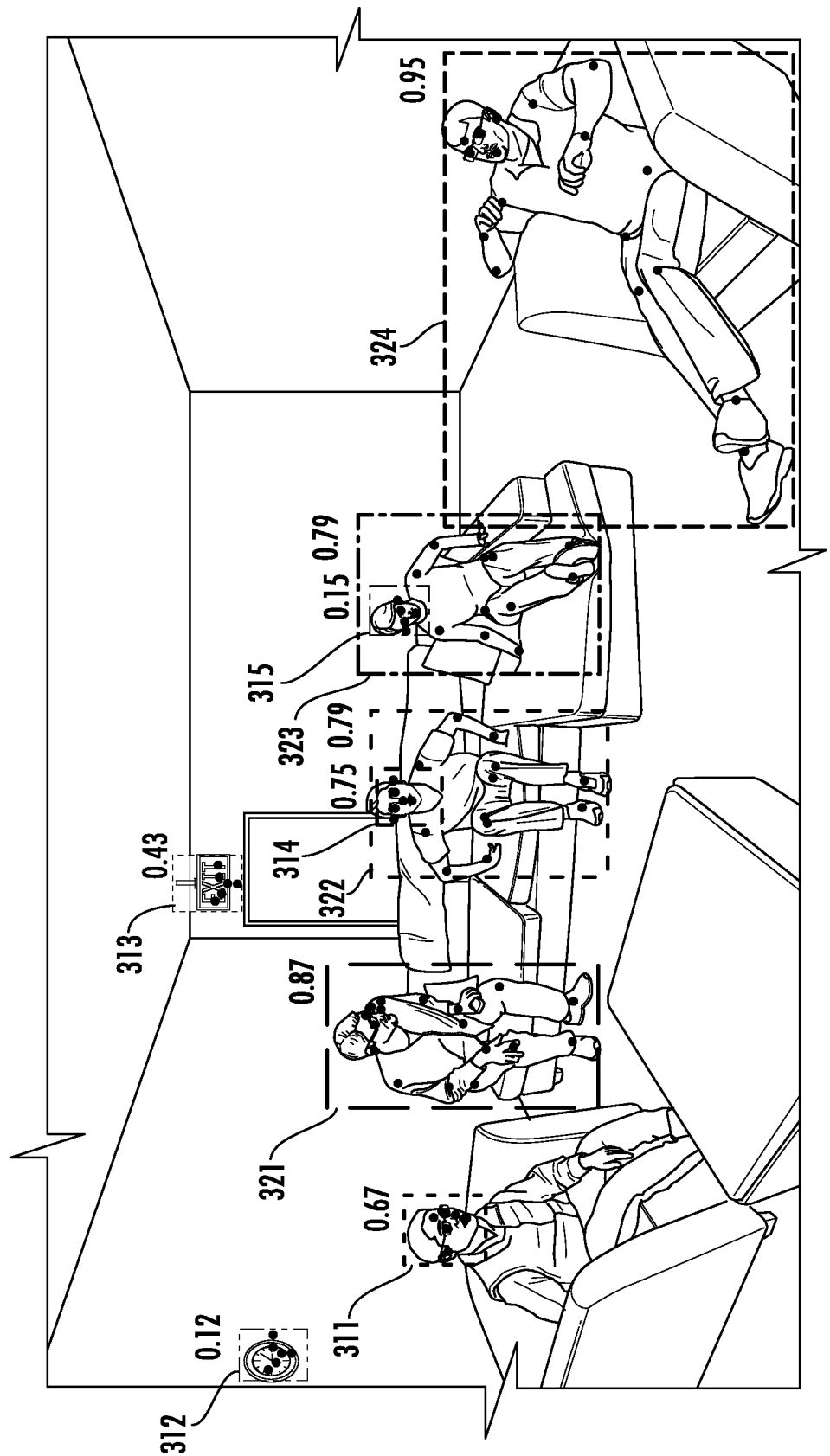
Figure 4E:
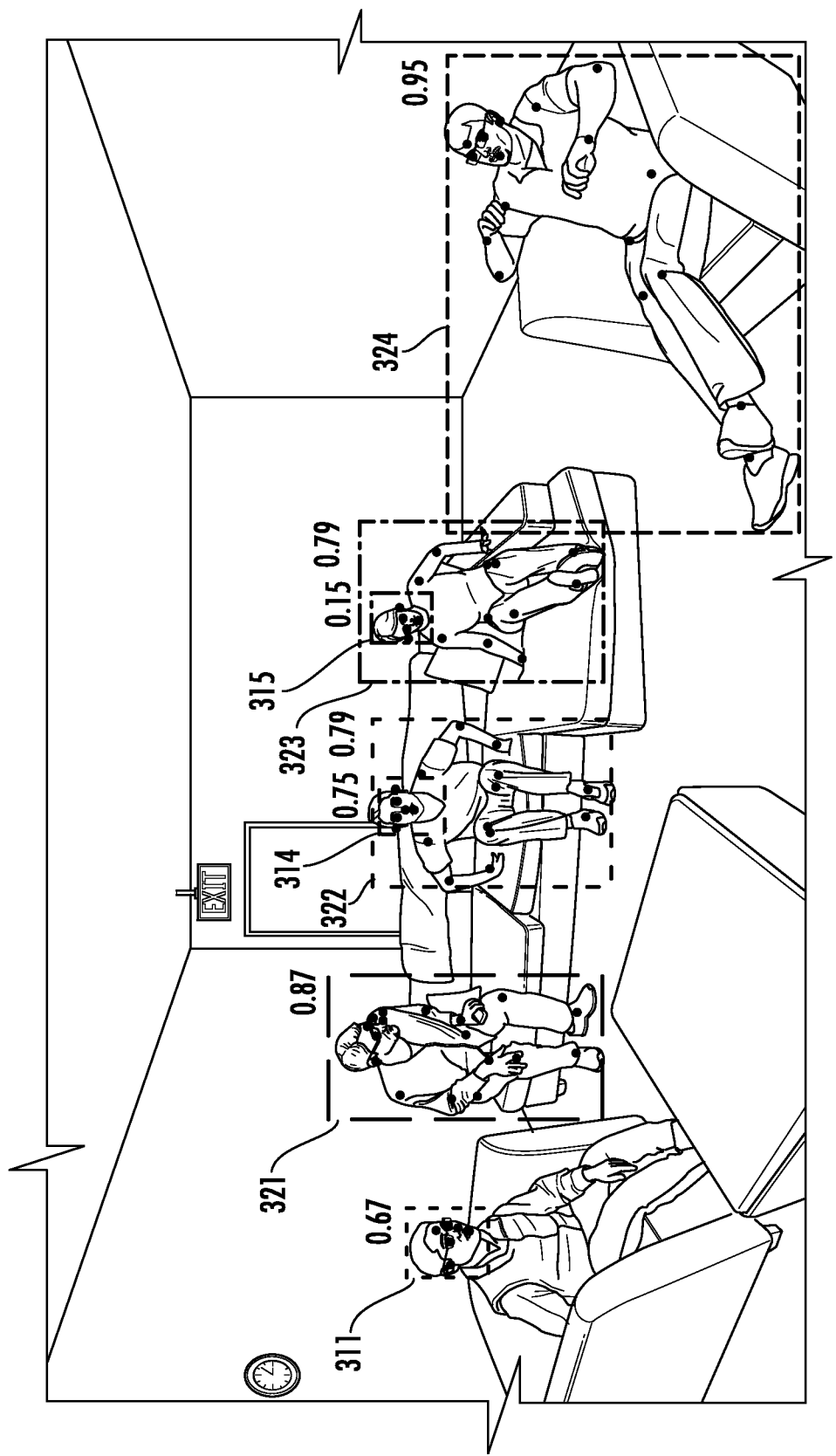

To provide an example, FIGS. 4D and 4E show the example screening of face detections. In particular, FIG. 4D shows five face detections 311, 312, 313, 314, and 315. Each of the detections has a corresponding confidence score. Using the example confidence threshold of 0.5, it can be seen that face detections 312, 313, and 315 have corresponding confidence scores that are below the example confidence threshold, while face detections 311 and 314 have confidence scores that are greater than the threshold. Thus, absent any manipulation, detections 311 and 314 would be kept while detections 312, 313, and 315 would be discarded. However, since face detection 315 has been successfully associated with person detection 323, the confidence score applied to face detection 315 can be reduced (e.g., to 0.1). Since the face detection 315 has a confidence score (0.15) which is greater than the reduced threshold (0.1), the face detection 315 (which is in fact correct) can be retained. However, since neither of the face detections 312 and 313 were associated with a person detection, the un-adjusted threshold of 0.5 can be applied to detections 312 and 313 (which are in fact incorrect), thereby resulting in these detections being discarded. This outcome is illustrated in FIG. 4E. Thus, it can be seen that cues from person detections and corresponding associations have been used to improve the face screening process. In particular, in the illustrated example, even though face detection 315 received a lower confidence score than face detection 313, face detection 315 was ultimately retained while face detection 313 was discarded. This outcome, in fact, improved the precision of the face detections.

Referring again to FIG. 2, the screening techniques described herein as applied to screening face detections 210 are equally able to be applied to screen person detections 208. For example, for each person detection 208 that was successfully associated with one of the face detections 210, the face detection screener 216 can increase a confidence score associated with such person detection 208 and/or can decrease a confidence threshold associated with screening the person detection 208. Alternatively or additionally, for each person detection 208 that was not successfully associated with one of the face detections 210, the face detection screener 216 can decrease a confidence score associated with such person detection 208 and/or can increase a confidence threshold associated with screening the such person detection 208.

According to another aspect of the present disclosure, in addition or alternatively to the face detection screener 216, the whole person association system 119 can include a face hallucinator 218 that can hallucinate face detections based on unassociated person detections, or vice versa. For example, for a particular person detection 208 (e.g., a person detection to which no face detection 210 was associated after performing the association process described above), the face hallucinator 218 can generate a hallucinated face detection based at least in part on the detected body location of the detected human body provided by the person detection 208. The hallucinated face detection can indicate a hallucinated face location in the input image of a face associated with the detected human body.

In particular, in some implementations, the location and/or pose information provided by a person detection 208 can be used to generate the hallucinated face detection. As an example, as described above, in some implementations, the person detection 208 can describe one or more body pose landmarks respectively associated with one or more body components of the detected human body. In such implementations, generating the hallucinated face detection based at least in part on the detected body location of the detected human body can include generating one or more hallucinated face pose landmarks based at least in part on the one or more body pose landmarks. For example, the body pose landmarks of the person detection 208 can specifically include facial landmarks and, in such instances, the facial landmarks can be directly used to generate the hallucinated face pose landmarks. In other implementations, the body pose landmarks of the person detection may include only landmarks associated with a torso or limbs of the body and generating the hallucinated face pose landmarks can include projecting a body map (e.g., that includes information about typical spacing between various body landmarks and/or facial landmarks) onto the torso or limb landmarks to identify the hallucinated face pose landmarks. Geometry processing can be performed to determine the extent or boundaries of the hallucinated face and/or other information such as facial pose information.

In some implementations, the face hallucinator 218 can choose to keep only hallucinated faces that satisfy certain characteristics or criteria. As one example, to be retained, a hallucinated face detection may be required to or have head pose within a relatively narrow frontal window. For example, the yaw, pitch, and/or roll angles associated with a hallucinated face may be required to be within approved ranges in order for the hallucinated face to be retained.

In some implementations, faces can be hallucinated for any person detection 208 that does not have an associated face detection. In other implementations, faces can be hallucinated only for person detection(s) that (1) do not have an associated face detection and (2) have a confidence score greater than some threshold value. Each hallucinated face can then be associated with the corresponding person detection to generate a whole person detection or "appearance," thereby generating a set of final appearances 220.

In such fashion, the face hallucinator 218 can hallucinate faces for un-associated person detections. This can reduce false negative face detections, in which a face is depicted in the image but not identified by the face detector (e.g., which can occur when a face is highly backlit or the face is partially occluded). Thus, recall exhibited by the final face detections (e.g., inclusive of the hallucinated faces) can be boosted by combining evidence from multiple detection types in the same image (or across multiple images). Improving recall of the face detection can also provide the benefit of saving computing resources. Stated differently, because hallucination of faces as described herein results in more face detections occurring overall, the face detection model 206 may not need to be run on as many frames to achieve the same results, particularly when detections are tracked across frames. Thus, fewer executions of the model(s) overall results in saved resources such as saved memory usage, processor usage, etc.

Figure 4F:
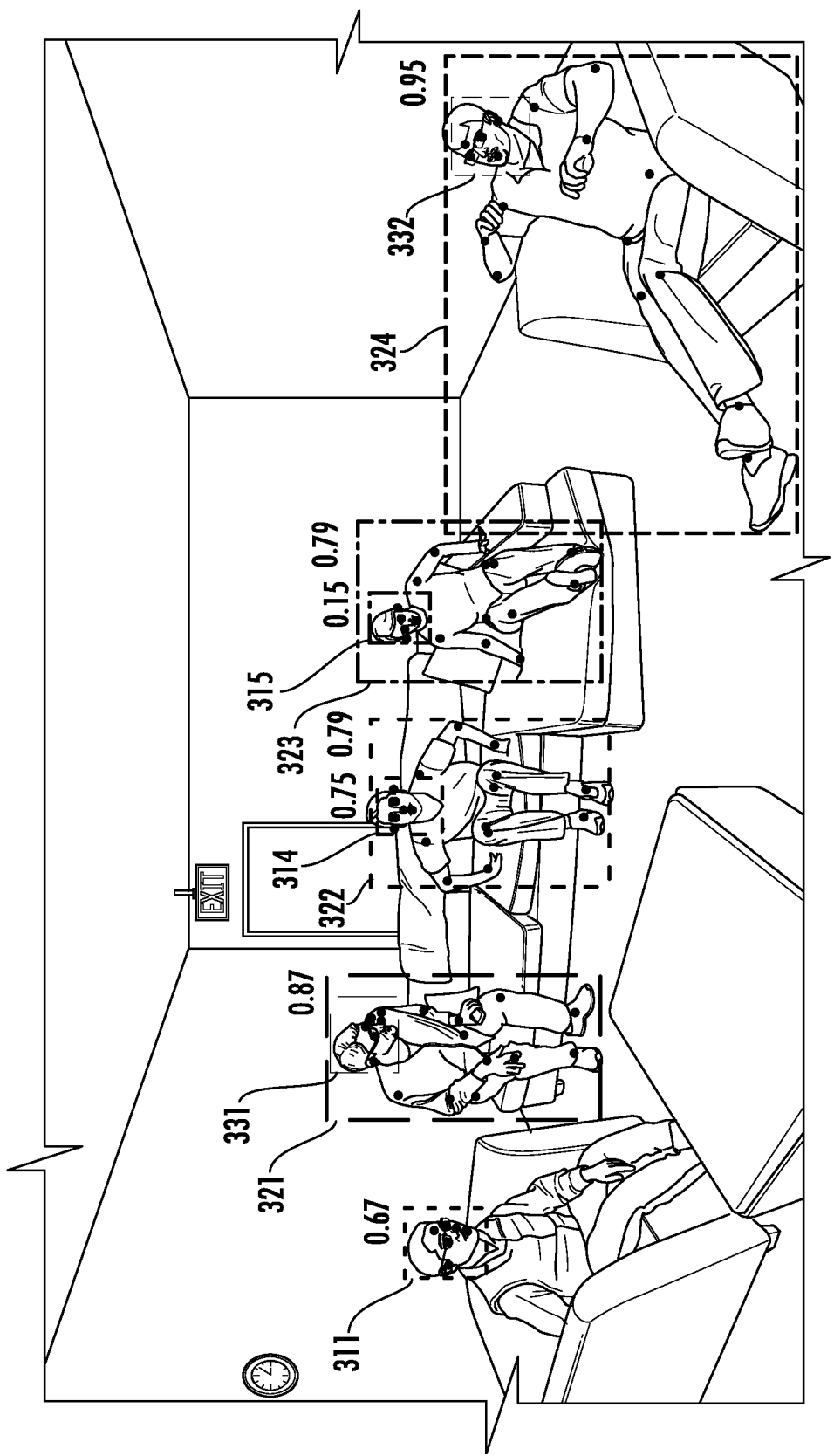
Figure 4G:
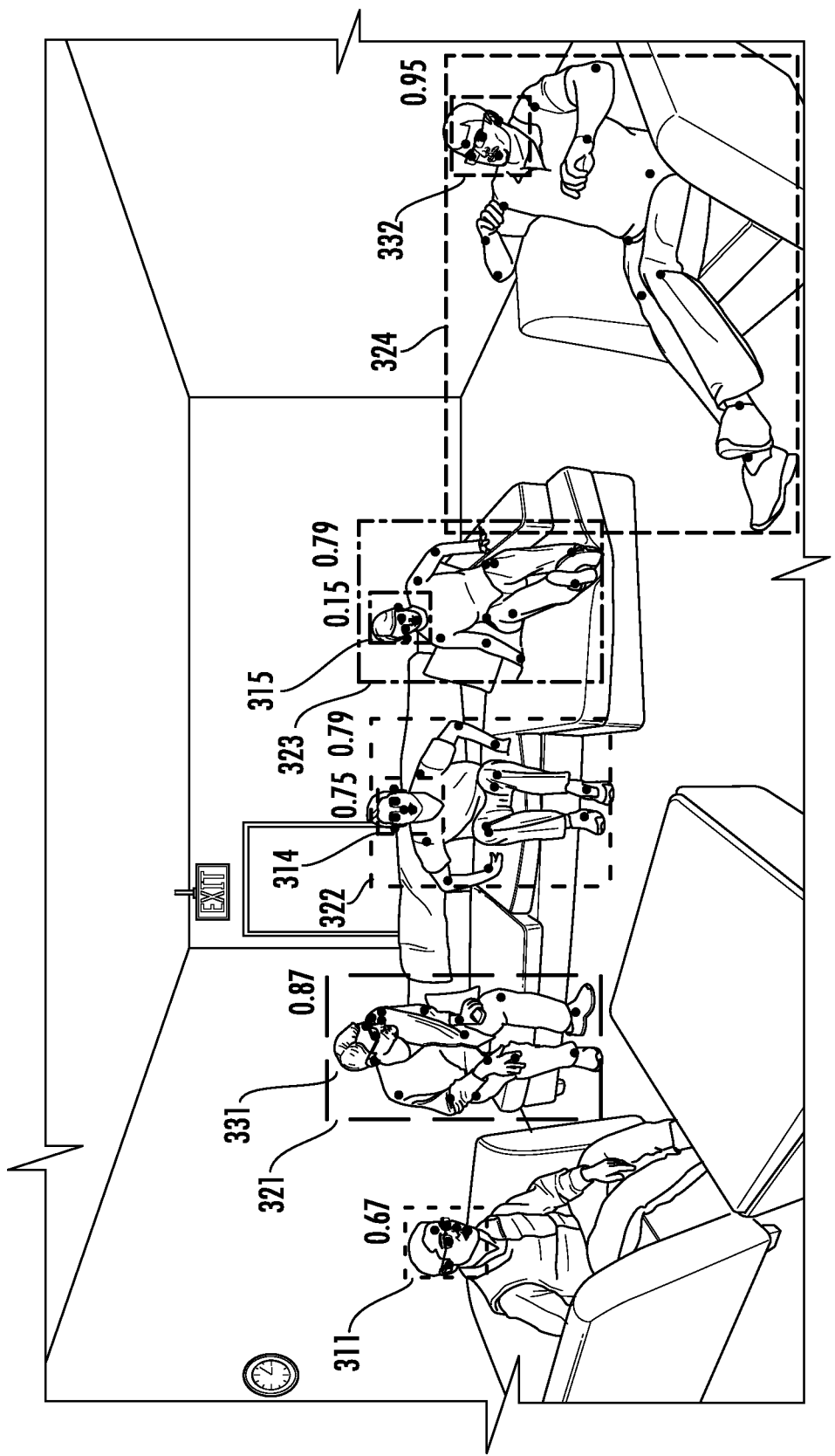

FIGS. 4F and 4G show an example of the face hallucination process and outcome. For example, referring to FIG. 4E, it can be seen that person detections 321 and 324 did not previously have face detections associated therewith. Referring to FIG. 4F, it can be seen that hallucinated face detections 331 and 332 have been hallucinated for person detections 321 and 324, respectively. For example, the respective facial landmark information included in person detections 321 and 324 can be used to respectively generate the hallucinated face detections 331 and 332. The hallucinated face detections 331 and 332 can be analyzed to determine if they meet certain acceptance criteria. As an example, referring to FIG. 4G, it can be seen that hallucinated face detection 331 was discarded because, for example, the hallucinated face detection 331 had a face tilt of −50 degrees, which was outside an example acceptable tilt angle range. However, hallucinated face detection 332 has been retained.

Referring again to FIG. 2, in some implementations, the whole person association system 119 can be an initial stage in a larger process that includes a number of downstream actions performed after detection of the person or face, such as, for example, recognizing the face (e.g., to unlock a mobile device, to interpret a command, to cluster or search for photographs in a photograph management application), detecting a gaze direction associated with the human (e.g., to understand a subject of a verbal command issued by the human), or other activities. Thus, in some examples, a portion of the input image 202 that corresponds to a hallucinated face detection can be cropped and sent to a downstream model (e.g., facial recognition model and/or gaze detection model) for processing. As such, the face hallucination enables application of face-related technologies to specific portions of an image, rather than the image as a whole, which results in savings of processing time, computational power, memory usage, etc.

The various thresholds described with respect to FIG. 2 can be manually set or can be learned based on training data. The various thresholds described herein can be fixed or can be adaptive based on various characteristics such as, for example, image resolution, image lighting, manual tuning to control tradeoffs (e.g., precision vs. recall), confidence values associated with the face detection and/or person detection, etc.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system that screens face detections based on association with person detections, the computer system comprising:
    one or more processors;
    a machine-learned person detection model that is configured to detect human bodies depicted in images;
    a machine-learned face detection model that is configured to detect human faces depicted in images; and
    one or more non-transitory computer-readable media that collectively store instructions that, when executed by one or more computing devices, cause the computer system to perform operations, the operations comprising:
        obtaining an input image;
        inputting the input image into the machine-learned person detection model and the machine-learned face detection model;
        receiving one or more person detections as an output of the machine-learned person detection model, wherein each of the one or more person detections indicates a respective detected body location of a respective detected human body in the input image;
        receiving one or more face detections as an output of the machine-learned face detection model, wherein each of the one or more face detections indicates a respective detected face location of a respective detected human face in the input image; and
        for at least a first face detection of the one or more face detections:
            determining whether the first face detection is associated with one of the person detections; and
            modifying one or both of a first confidence score associated with the first face detection and a first confidence threshold associated with the first face detection based at least in part on whether the first face detection is associated with one of the person detections.

2. The computer system of claim 1, wherein modifying one or both of the first confidence score and the first confidence threshold comprises one of the following:
    when the first face detection is associated with one of the person detections, one or both of: increasing the first confidence score associated with the first face detection and reducing the first confidence threshold associated with the first face detection; or
    when the first face detection is not associated with one of the person detections, one or both of: decreasing the first confidence score associated with the first face detection and increasing the first confidence threshold associated with the first face detection.

3. The computer system of claim 1, wherein the operations further comprise, for at least the first face detection, after modifying one or both of the first confidence score and the first confidence threshold:
    comparing the first confidence score to the first confidence threshold;

when the first confidence score is greater than the first confidence threshold, retaining the first face detection; and when the first confidence score is less than the first confidence threshold, discarding the first face detection.

4. The computer system of claim 1, wherein:
the machine-learned person detection model and the machine-learned face detection model are included in a single, multi-headed model that comprises a shared feature extraction portion, a person detection head, and a face detection head;
wherein inputting the input image into the machine-learned person detection model and the machine-learned face detection model comprises inputting the input image into the shared feature extraction portion.

5. The computer system of claim 1, wherein determining whether the first face detection is associated with one of the person detections comprises comparing a first set of pose information associated with the first face detection to at least one of one or more second sets of pose information respectively associated with the one or more person detections to determine whether the first face detection is associated with one of the person detections.

6. The computer system of claim 5, wherein:
the first set of pose information associated with the first face detection describes one or more first locations associated with one or more facial landmarks for the respective detected face associated with the first face detection;
the respective second set of pose information associated with each of the one or more person detections describes one or more second locations associated with the one or more facial landmarks for the respective detected human body associated with such person detection; and
comparing the first set of pose information associated with the first face detection to the at least one of the one or more second sets of pose information respectively associated with the one or more person detections comprises, for the at least one the one or more second sets of pose information, determining a respective distance between the one or more first locations described by the first set of pose information and the respective one or more second locations described by such second set of pose information.

7. The computer system of claim 1, wherein determining whether the first face detection is associated with one of the person detections comprises determining, for at least one of the one or more person detections, an amount of overlap between the respective detected face location indicated by the first face detection and the respective detected body location indicated by such person detection.

8. The computer system of claim 1, wherein the operations further comprise generating a whole person detection that associates the first face detection with the one of the person detections.

9. The computer system of claim 8, wherein the operations further comprise carrying the whole person detection forward to a subsequent image to perform whole person tracking over plural image frames.

10. The computer system of claim 1, wherein the operations further comprise providing the first face detection to one or both of a machine-learned facial recognition model for facial recognition or a machine-learned gaze detection model for gaze detection.

11. The computer system of claim 1, wherein the operations further comprise:
when the first face detection is associated with one of the person detections:
increasing a second confidence score associated with the associated person detection; or
reducing a second confidence threshold associated with the associated person detection.

12. One or more non-transitory computer-readable media that collectively store instructions that, when executed by one or more processors, cause the one or more processors to perform operations, the operations comprising:
determining one or more face detections and one or more person detections relative to an image, where each face detection indicates a respective region or set of pixels of the image believed to contain a face and each person detection indicates a respective region or set of pixels believed to contain a person;
computing a respective confidence score associated with each face detection and each putative person detection;
identifying a respective set of pose points associated with each person detection that indicate a location of a set of body landmarks;
determining an association score between at least a first face detection and at least a first person detection using the respective set of pose points associated with the first person detection;
using the association score and the respective confidence score for the first face detection to produce an updated confidence score for the first face detection; and
determining whether to discard the first face detection based on a comparison of the updated confidence scores to a confidence threshold.

13. The one or more non-transitory computer-readable media of claim 12, wherein the operations further comprise:
determining whether to produce a hallucinated face detection for the first person detection based at least in part on the association score between the first face detection and the first person detection.

* * * * *